Patented June 19, 1928.

UNITED STATES PATENT OFFICE.

LEON LILIENFELD, OF VIENNA, AUSTRIA.

PROCESS FOR PRODUCING ARTIFICIAL MATERIAL.

No drawing. Application filed May 22, 1926, Serial No. 111,037, and in Austria May 30, 1925.

This invention is an improvement in or modification of the invention of application Ser. No. 727,802. That application describes the manufacture of artificial materials by bringing a solution or paste of a cellulose-thiourethane in which at least one hydrogen atom of the amido group is replaced by an alcohol radical into the form of an artificial material, and precipitating it by means of an acid; it is stated that even dilute inorganic or organic acids act quickly and completely as precipitating agents, so that no difficulty is experienced in preparing artificial materials such as artificial threads or hair, films, bands, plates, plastic masses, layers, coatings and the like by coagulating solutions of the said cellulose-thiourethanes by means of a dilute acid.

According to the present invention, the artificial materials which may be prepared by the manufacture of the said application attain especially valuable properties if there is used as the precipitating agent in the aforesaid manufacture of a strong acid, for instance sulphuric acid of 25–80 per cent strength, and advantageously of 40–78 per cent strength, or phosphoric acid of 45–70 per cent strength, or hydrochloric acid of 20–35 per cent strength, or acetic acid of 70–100 per cent strength.

The products, after washing and drying, particularly threads, films, plates, layers or the like possess in addition to a high lustre a tensile strength both in the dry and in the wet condition which is considerably superior to that of the products obtainable from N-substituted cellulose-thiourethanes by using other precipitating agents, particularly weak acids. As an instance, it may be stated that by precipitating a solution of a suitable N-substituted cellulose-thiourethane by means of a strong acid, such as sulphuric acid of 50 to 70 per cent strength, it is possible to obtain artificial silk having a high lustre and approaching, or in many cases equaling or even surpassing natural silk in respect of tensile strength both in the wet and in the dry state. As a further instance, it may be mentioned that films prepared according to the invention from a solution of a suitable N-substituted cellulose-thiourethane are considerably more flexible than films prepared from the same solution by precipitation by means of a dilute acid. In respect of artificial threads, the use of a strong acid as precipitating agent offers in addition to the tensile strength in the wet or dry state the further advantage that by its aid it is possible to prepare in a simple manner threads which are much finer than those obtainable with the aid of a dilute acid.

In carrying out the invention a solution or paste of an N-alkyl, N-aryl, or N-aralkyl-cellulose-thiourethane (an N-alkyl, N-aryl or N-aralkyl-cellulose-thiocarbamic ester) in a suitable solvent, for instance an aqueous solution of an alkali, is brought into the form of an artificial material, for instance a thread, film, band, plate, plastic mass, layer, coating or the like, and is then treated to cause separation of solid by means of a strong acid, for instance sulphuric acid of 25–80 per cent strength, advantageously of 40–78 per cent strength. The strong acid may be used either as such or mixed with another precipitating agent; thus there may be added to the acid a neutral salt or an acid salt (for example Glauber salt, sodium bisulphate, ammonium sulphate, or zinc sulphate), or an organic substance (for example, an alcohol, acetone, or glycerin) or a sugar (for instance, glucose or the like). The strong acid may also be used as such or mixed with another strong acid, for example there may be used a mixture of sulphuric acid with phosphoric acid, hydrochloric acid, strong acetic acid or the like.

The temperature of the strong acid may very within wide limits. For instance, there may be used sulphuric acid of 50 to 65 per cent strength at room temperature or below (for example 0°–10° C.) or above room temperature (for example 30° C.). The acid may even be cooled below 0° C., for example to −10° C. The articles obtained by coagulation with the aid of a strong acid are very plastic, and may be stretched or extended either immediately after their formation (i. e. in the precipitating bath), or subsequently, after they have been removed from the bath. As soon as the said articles are brought into contact with water, that is to say, as soon as the acid which they still contain is diluted or removed, they become rigid, and less plastic.

The further treatment of the precipitated threads, by washing, drying, and if desired steaming, is carried out in the manner described in application Ser. No. 727,802, filed July 23, 1924.

The N-substituted cellulose-thiourethanes which form the parent material of the present invention may be prepared according to the processes described in application Ser. No. 727,805, filed July 23, 1924, or application Serial No. 111,036, filed May 22, 1926.

The following examples illustrate the invention, the parts being by weight unless otherwise stated:—

1. Artificial threads, particularly artificial silk and artificial hair.

*Example 1.*—1000 parts of viscose (prepared for instance by soaking 100 parts of sulphite-cellulose in sheet or fleece-form in 1000–2000 parts of caustic soda lye of 18 per cent strength at 15–18° C., allowing to stand at room temperature for 3–24 hours, pressing until the weight is reduced to 300–350 parts, comminuting, allowing to ripen if desired at room temperature for 6–72 hours, treating for several hours with 50–60 parts of carbon disulphide and dissolving in sufficient water to produce 1000 parts of solution), corresponding with 100 parts of parent cellulose, are diluted with 1000 parts of water, either in the fresh state or after standing for a short or long period (for instance, 6 hours to 3 days), and the solution is cooled to a temperature of 4–8° C. There is then added, whilst stirring, and without previous neutralization of the viscose, a solution prepared by dissolving 65–70 parts of monochloracetic acid in 130–140 parts of water and neutralizing the solution so obtained by means of powdered sodium bicarbonate, sodium carbonate or the like. After about 3–5 hours, and in any case before the mixture tends to become appreciably thick or slimy, and without previously neutralizing the mixture, there are added 30–120 parts of aniline, or the equivalent quantity of ortho-toluidine, or aminophenol, and the mixture is stirred at room temperature. After several hours, the cellulose-xanthanilide, cellulose-xantho-toluidide or cellulose-xanthoxyanilide separates. After the mixture has been allowed to stand at room temperature for 24 hours to several days, preferably whilst stirring intermittently, the precipitated substance is removed from the mother liquor by filtering, centrifuging, straining or the like, thoroughly washed with water, and centrifuged or pressed.

The N-substituted cellulose-thiourethane, either in the crude, moist state, or after it has been previously dried, or previously washed with alcohol, or with alcohol and then with ether, benzene or the like, is now dissolved in a quantity of strong caustic soda solution, such that there is obtained a solution of the said thiourethane of 10–16 per cent strength in caustic soda solution of 6–8 per cent strength. This solution advantageously after it has been filtered is then spun in any known manner through fine nozzles in a bath of sulphuric acid of 50 per cent strength at room temperature, or at a temperature of 5–8° C., and the thread is washed and dried.

If desired, the thread may be stretched in any known manner whilst it is in the sulphuric acid bath, or after it has been removed from the bath, or whilst it is being collected (for instance wound). If the thread is stretched whilst it is in the bath, or is passing between the bath and the collecting device, this may be done in known manner by leading the thread over rods arranged between the nozzle and the collecting device (e. g. the bobbin or centrifuge), and situated in the acid or outside it. If desired, the threads may be steamed after washing before or after they are dried, whereby their tensile strength in the wet or dry state is still further increased.

*Example 2.*—The procedure is as in Example 1, with the exception that the cellulose-thiourethane used is prepared as follows:—

1000 parts of viscose of 10 per cent strength (calculated on the parent cellulose) prepared as described in Example 1 are diluted with 2000 parts of water and are treated, whilst stirring, and without previously being neutralized, with a solution prepared by dissolving 50–65 parts of monochloracetic acid in 200 parts of water and neutralizing the solution so obtained with sodium carbonate or bicarbonate. The mixture is allowed to stand at room temperature for about 3–24 hours, whilst stirring continuously or intermittently. There are then added to the mixture, which is not previously neutralized, 30–120 parts of aniline, or the equivalent quantity of ortho-toluidine or aminophenol, and the whole is thoroughly stirred. The cellulose-xanthanilide, cellulose-xantho-toluidide, or cellulose-xanthoxyanilide separates after several hours, and may be isolated, dissolved, and the solution obtained spun as in the preceding example.

*Example 3.*—The procedure is as in the preceding examples, with the exception that the cellulose-thiourethane is prepared as follows:—

1000 parts of viscose of 10 per cent strength (calculated on the parent cellulose) prepared as described in Example 1 are cooled to 4–10° C. without having been diluted, and there are added whilst stirring, and without previously neutralizing the viscose, a solution prepared by dissolving 30–40 parts of monochloracetic acid in 60–80 parts of water and neutralizing the solution so obtained. After 5–10 minutes, there are quickly introduced, whilst vigorously stirring, 400 parts by volume of acetic acid of 10 per cent strength, in a thin stream or in small portions; during this operation the mixture froths considerably. About 15 minutes after the addition of the acetic acid, there are added 30–120 parts of aniline, or the equivalent quantity of ortho-toluidine or aminophenol, the mixture is vigorously stirred or kneaded, and the cooling is discontinued. After the addition of the base, the mixture becomes very viscous, but during the continued stirring or kneading, it gradually becomes less viscous, and the product of the reaction separates after several hours. The product is worked up, dissolved, and spun as in Example 1.

*Example 4.*—The procedure is as in the preceding examples, with the exception that the cellulose-thiourethane is prepared as follows:—

1000 parts of viscose, of 10 per cent strength (calculated on the parent cellulose), prepared as described in Example 1, are diluted with 2000 parts of water, and without having been neutralized, are treated whilst stirring with a solution prepared by dissolving 65–70 parts of monochloracetic acid in 260–280 parts of water and neutralizing the solution so obtained. The mixture is allowed to stand for 3–24 hours, after which there are added in succession, whilst stirring, 240–250 parts by volume of acetic acid of 10 per cent strength and 30–120 parts of aniline, or the equivalent quantity of ortho-toluidine, or aminophenal, and the mixture is further stirred for several hours, after which the cellulose-xanthanilide, -toluidide, or -oxyanilide separates, and is isolated, dissolved and spun as described in Example 1.

*Example 5.*—The procedure is as in the preceding examples, with the exception that the cellulose-thiourethane is prepared as follows:—

1000 parts of viscose of 10 per cent strength (calculated on the parent cellulose), prepared as described in Example 1, are diluted with 5000 parts of water, and there is then added, whilst stirring, a solution prepared by dissolving 65–70 parts of monochloracetic acid in 500–600 parts of water and neutralizing the solution so obtained with sodium carbonate or bicarbonate. The mixture is allowed to stand at room temperature for 24–48 hours, during which time it is stirred continuously or intermittently. There are then added, in succession, whilst stirring, 450 parts by volume of acetic acid of 10 per cent strength, and 30–120 parts of aniline, or the equivalent quantity of ortho-toluidine or aminophenol, and the stirring is continued, the product of the reaction separating after several hours. It is worked up, dissolved, and spun in the manner described in Example 1.

*Example 6.*—The procedure is as in the preceding examples, with the exception that the cellulose-thiourethane is prepared as follows:—

1000 parts of viscose of 10 per cent strength (calculated on the parent cellulose), prepared as described in Example 1, are cooled without dilution to 6–10° C. and there are added, whilst stirring, 500–600 parts by volume of acetic acid of 10 per cent strength; the mixture is then stirred for a period of ½–1 hour, after which a neutralized solution of 20–30 parts of chloracetic acid in 40–60 parts of water is added. The mixture is kept at 8–10° C. for about 20 hours, during which it is stirred continuously or intermittently, and after this period there are added 30–60 parts of aniline or the equivalent quantity of ortho-toluidine or aminophenol. After several hours stirring, the product of the reaction separates, and is isolated, dissolved and spun as described in the previous examples.

*Example 7.*—100 parts of viscose of 10 per cent strength (calculated on the parent cellulose), prepared as described in Example 1, are diluted with 5000 parts of water and mixed, whilst stirring, with 500–600 parts by volume of acetic acid of 10 per cent strength. After a period of ½–1 hour there is added, whilst stirring, a neutralized solution of 30 parts of monochloracetic acid in 240 parts of water, and the mixture is allowed to stand at room temperature for 24–48 hours, during which period it is stirred continuously or intermittently. There are then added to the mixture 30–120 parts of aniline, or the equivalent quantity of ortho-toluidine or aminophenol, and stirring is continued. The product separates after several hours, and is isolated, dissolved and spun as in Example 1.

In the preceding examples there may be used instead of the cellulose-thiourethanes described therein a compound of cellulose prepared as described in application Serial No. 111,036, filed May 22, 1926.

Instead of the aniline, ortho-toluidine or aminophenol used in the foregoing examples, use may be made of other nitrogen bases, for example benzylamine, methylamine, ethylamine and the like. Generally the benzyl, methyl and ethyl-cellulose-thiourethanes tend to separate after a shorter period, otherwise the procedure is as above described. When dissolving the benzyl-cellulose-thiourethanes in alkali, a small proportion of alcohol may if desired be added to the solution.

Instead of sulphuric acid of 50 per cent strength there may be used sulphuric acid of 30 per cent, 40 per cent, or 55 per cent or 60 per cent strength. Very strong sulphuric acid, for example such of 60 to 78 per cent strength may be particularly used in such cases in which for the preparation of the N-substituted thiourethane of cellulose a viscose made from a not matured soda cellulose or from a soda cellulose that has been matured for a short time only has been employed. There may also be added to the sulphuric acid a salt, for instance Glauber salt or ammonium sulphate, or an organic substance, for instance alcohol, acetone, glycerine, sugar, glucose syrup or the like.

II. Films.

Example 8.—A solution prepared for spinning in the manner described in any of the foregoing examples is forced through a slot into a bath of sulphuric acid of 50 per cent strength. The film produced may be stretched or extended either in the acid or after it has been removed from the bath. The solidified film is thoroughly washed with water and dried, and may if desired be steamed. In order to increase its flexibility it may be treated in a closed space with the vapour of an aqueous solution of pyridine.

The manufacture of plates, plastic masses, artificial leather, bookbinder's cloth and other artificial materials, and the finishing of textile materials follow from the examples given above and those given in application Ser. No. 727,802.

I claim:

1. Process for producing artificial materials, which process comprises bringing an aqueous alkaline solution of a cellulose-thiourethane in which at least one hydrogen atom of the amido group is replaced by an alcohol radical, into the form of an artificial material and treating it with strong acid.

2. Process for producing artificial materials, which process comprises bringing an aqueous alkaline solution of a cellulose-thiourethane in which at least one hydrogen atom of the amido group is replaced by an alcohol radical, into the form of an artificial material and treating it with strong mineral acid.

3. Process for producing artificial materials, which process comprises bringing an aqueous alkaline solution of a cellulose-thiourethane in which at least one hydrogen atom of the amido group is replaced by an alcohol radical, into the form of an artificial material and treating it with strong sulphuric acid.

4. Process for producing artificial materials, which process comprises bringing an aqueous alkaline solution of a cellulose-thiourethane in which at least one hydrogen atom of the amido group is replaced by an alcohol radical, into the form of an artificial material and treating it with sulphuric acid of 50 to 78 per cent strength.

5. Process for producing artificial materials, which process comprises bringing an aqueous alkaline solution of a phenyl-thiourethane of cellulose into the form of an artificial material and treating it with strong acid.

6. Process for producing artificial materials, which process comprises bringing an aqueous alkaline solution of a phenyl-thiourethane of cellulose into the form of an artificial material and treating it with strong mineral acid.

7. Process for producing artificial materials, which process comprises bringing an aqueous alkaline solution of a phenyl-thiourethane of cellulose into the form of an artificial material and treating it with strong sulphuric acid.

8. Process for producing artificial materials, which process comprises bringing an aqueous alkaline solution of a phenyl-thiourethane of cellulose into the form of an artificial material and treating it with sulphuric acid of 50 to 78 per cent strength.

9. Process for producing artificial materials, which process comprises bringing an aqueous alkaline solution of a cellulose-thiourethane in which at least one hydrogen atom of the amido group is replaced by an alcohol radical, into the form of an artifical material and treating it with a mixture of strong sulphuric acid and another substance.

10. Process for producing artificial materials, which process comprises bringing an aqueous alkaline solution of a cellulose-thiourethane in which at least one hydrogen atom of the amido group is replaced by an alcohol radical, into the form of an artificial material and treating it with a mixture of strong sulphuric acid and a salt.

11. Process for producing artificial materials, which process comprises bringing an aqueous alkaline solution of a phenyl-thiourethane of cellulose into the form of an artificial material and treating it with a mixture of strong sulphuric acid and another substance.

12. Process for producing artificial materials, which process comprises bringing an aqueous alkaline solution of a phenyl-thiourethane of cellulose, into the form of an artificial material and treating it with a mixture of strong sulphuric acid and a salt.

13. Process for producing artificial materials, which process comprises bringing an aqueous alkaline solution of a cellulose-thiourethane in which at least one hydrogen atom of the amido group is replaced by an alcohol radical, into the form of an artificial material and treating it with a mixture of strong acid and another substance.

14. The process for producing artifical materials which comprises bringing an aqueous alkaline solution of a cellulose-thiourethane in which one hydrogen atom of the amido group is replaced by an alcohol radical into the form of an artificial material and treating it with an acid solution of not substantially less than 20 per cent strength.

In testimony whereof I affix my signature.

Dr. LEON LILIENFELD.